(12) United States Patent
Trantham et al.

(10) Patent No.: US 11,295,202 B2
(45) Date of Patent: Apr. 5, 2022

(54) STORAGE DEVICE WITH CONFIGURABLE NEURAL NETWORKS

(71) Applicant: Seagate Technology LLC, Cupertino, CA (US)

(72) Inventors: Jon Trantham, Chanhassen, MN (US); Kevin Arthur Gomez, Eden Prairie, MN (US); Frank Dropps, Maple Grove, MN (US); Antoine Khoueir, Edina, MN (US); Scott Younger, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 1275 days.

(21) Appl. No.: 14/626,172

(22) Filed: Feb. 19, 2015

(65) Prior Publication Data
US 2016/0247080 A1    Aug. 25, 2016

(51) Int. Cl.
*G06N 3/063* (2006.01)
*G06N 20/00* (2019.01)
*G06N 3/04* (2006.01)

(52) U.S. Cl.
CPC ............. *G06N 3/063* (2013.01); *G06N 20/00* (2019.01); *G06N 3/0472* (2013.01)

(58) Field of Classification Search
CPC ....................................................... G06N 3/04
See application file for complete search history.

(56) References Cited

U.S. PATENT DOCUMENTS

| | | | | |
|---|---|---|---|---|
| 3,503,060 A | * | 3/1970 | Goddard | G11B 5/5521 360/78.04 |
| 4,947,357 A | * | 8/1990 | Stewart | G01R 31/318558 702/118 |
| 5,155,802 A | | 10/1992 | Mueller et al. | |
| 5,289,581 A | * | 2/1994 | Berenguel | G06F 12/0866 711/113 |
| 6,711,293 B1 | * | 3/2004 | Lowe | G06K 9/4671 382/219 |
| 7,627,540 B2 | | 12/2009 | Snook et al. | |
| 2004/0158543 A1 | * | 8/2004 | Salam | G06N 3/063 706/26 |
| 2012/0259804 A1 | | 10/2012 | Brezzo et al. | |
| 2014/0019392 A1 | | 1/2014 | Buibas | |

OTHER PUBLICATIONS

Chloupek, Martin, et al. "Test pattern decompression in parallel scan chain architecture." 2013 IEEE 16th International Symposium on Design and Diagnostics of Electronic Circuits & Systems (DDECS). IEEE, 2013. pp. 219-223. (Year: 2013).*

(Continued)

*Primary Examiner* — Vincent Gonzales
(74) *Attorney, Agent, or Firm* — Mueting Raasch Group

(57) ABSTRACT

An apparatus comprises a mass storage unit and a plurality of circuit modules including a machine learning module, a programmable state machine module, and input/output interfaces. Switching circuitry is configured to selectively couple the circuit modules. Configuration circuitry is configured to access configuration data from the mass storage unit and to operate the switching circuitry to connect the circuit modules according to the configuration data.

19 Claims, 10 Drawing Sheets

(56) References Cited

OTHER PUBLICATIONS

Srivastava, Mani B., Anantha P. Chandrakasan, and Robert W. Brodersen. "Predictive system shutdown and other architectural techniques for energy efficient programmable computation." IEEE Transactions on Very Large Scale Integration (VLSI) Systems 4.1 (1996): 42-55. (Year: 1996).*
S. Russell and P. Norvig, Artificial Intelligence: A Modern Approach, 2nd Ed., 2003, pp. 462-648. (Year: 2003).*
Demuth, Howard, Mark Beale, and Martin Hagan. "Neural network toolbox 6 User's Guide" For Use with MATLAB. The MathWorks Inc 2010. 901 pages. (Year: 2010).*

* cited by examiner

STORAGE DEVICE WITH CONFIGURABLE NEURAL NETWORKS

SUMMARY

Embodiments are directed to an apparatus that comprises a mass storage unit and a plurality of circuit modules including a machine learning module, a programmable state machine module, and input/output interfaces. Switching circuitry is configured to selectively couple the circuit modules. Configuration circuitry is configured to access configuration data from the mass storage unit and to operate the switching circuitry to connect the circuit modules according to the configuration data.

Various embodiments involve a method comprising receiving, from a host, a configuration defining connections between circuit modules of a storage compute device, the circuit modules including a machine learning module, a programmable state machine module, and input/output interfaces. The configuration is applied to switching circuitry to selectively couple the circuit modules. A data stream is processed via the coupled circuit modules.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
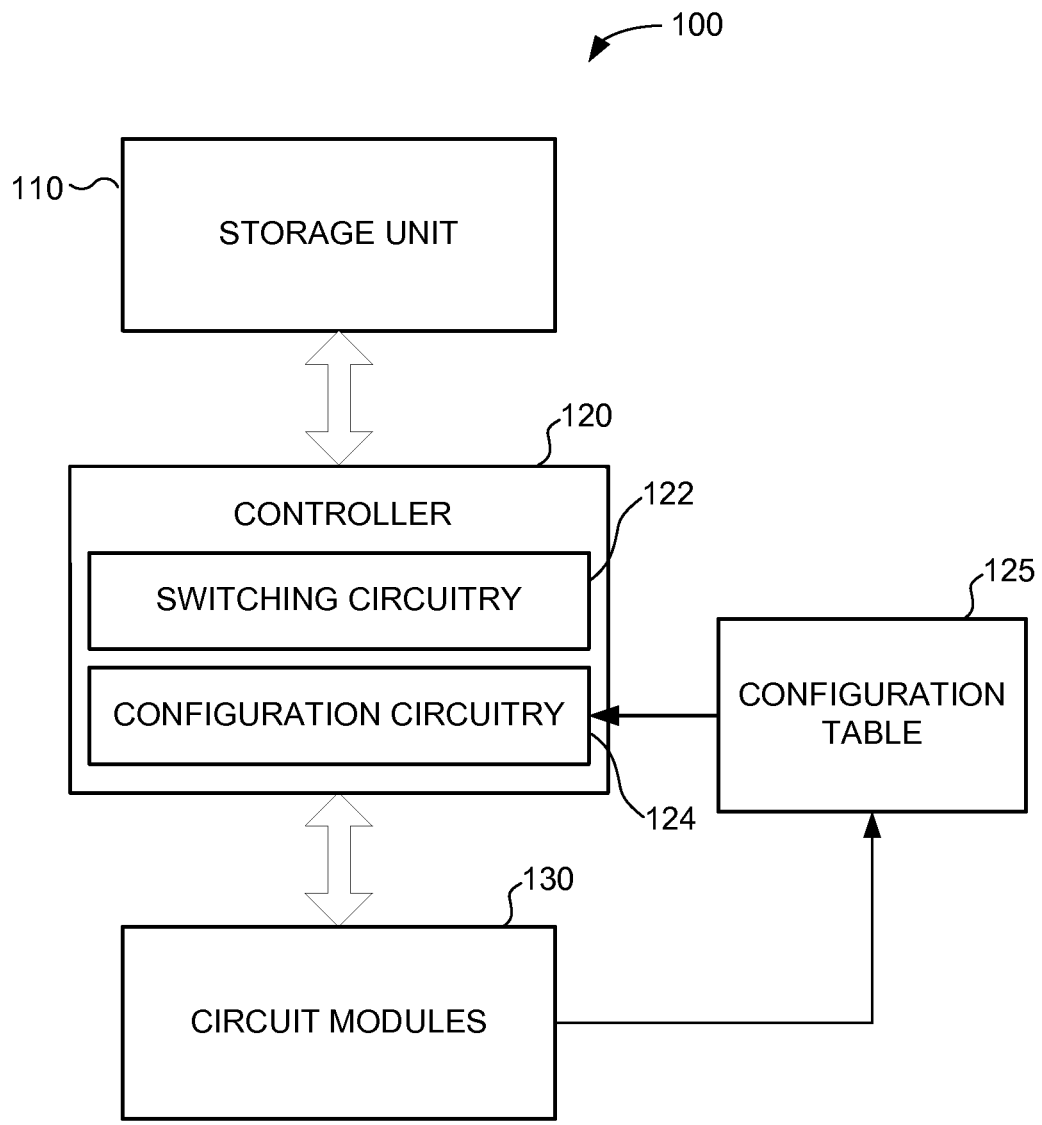
FIG. 1 is a block diagram of an apparatus according to an example embodiment.

Probabilistic inference networks (PINs), such as neural networks, deep-belief networks, and Bayesian networks are information processing systems that in some ways mimic the way biological nervous systems such as the human brain processes information. According to some implementations, a PIN comprises a large number of interconnected nodes which are processing elements. The nodes work in conjunction to solve specific problems. In some cases a PIN system may include mass storage. The system can have various subsystems and may be programmed to interconnect a number of the subsystems for an application. The interconnections between the subsystems and the number and type of subsystems can be programmed depending on the application, for example.

Some embodiments described herein may be implemented as a data storage device that performs internal computations on data on behalf of a host PIN, and is referred to herein as a storage compute device. While a data storage device, such as a hard drive, solid-state drive (SSD), hybrid drive, etc., generally include data processing capabilities, such processing is related to the storage and retrieval of user data. So while the data storage device may perform some computations on the data, such as compression, error correction, etc., these computations are invisible to the host, and results of the computation are not expressly returned to the host as a result of the computation. Similarly, other computations, such as logical-to-physical address mapping, involve tracking host requests, but are intended to hide these tracking operations from the host.

While a storage compute device as described herein may be able to perform as a conventional storage device, e.g., handling host data storage and retrieval requests, such devices may include additional computational capability that can be used for certain applications. For example, a large computation may be distributed by a host to an array of storage compute devices. The host manages overall processing of the computation by passing messages and data to the storage compute devices, which causes the storage devices to perform computations. The computations may involve large data sets, and may therefore involve loading and storing data from a non-volatile memory (e.g., flash memory) during processing.

Besides performing mathematical computations (e.g., matrix operations) a storage compute device may be able to perform management tasks for the operation of the PIN, such as configuring the network at boot-up and retaining its state upon loss of power. Embodiments described herein use a multilevel nonvolatile storage compute device to store configuration instructions for arranging connections between subsystems. The arrangement of the subsystems forms a probabilistic inference network. The mass storage unit within the storage compute device provides persistent storage for the interconnections and/or other probabilistic inference network information. The network may be powered down at any time without losing the mapping and/or connections and thus relearning is not needed. In some embodiments, the mapping may be static. In some cases, the device is set to the same state upon boot-up. In other embodiments, the mapping may be dynamically changed by a user and/or by the probabilistic inference network. For example, dynamic modification of the mapping can involve eliminating some connections and/or adding other connections.

Subsystems of the storage compute device may include a neural network. A neural network uses interconnected computing elements (e.g., neuron-like elements implemented in software and/or circuits) that can adaptively weight interconnections, e.g., during training and prediction. The weighted interconnections form a network that can predict whether a given pattern matches a learned pattern. The neural network can be generic, e.g., does not need to have domain-specific knowledge of the data being analyzed. However, for best results, the encoding of the data fed into the neural network may be tailored for a particular application domain, e.g., image recognition, speech recognition, etc. According to various embodiments, the storage compute device can be disconnected from the various subsystems. Connecting the storage compute device to the system may cause configuration to occur between the subsystems.

FIG. 1 is a block diagram that conceptually illustrates embodiments discussed herein. The block diagram depicts system 100 that includes a storage unit 110. In some cases the storage unit 110 is a mass storage unit (e.g. a solid-state drive). In some cases the memory in the storage unit 110 may be arranged as an addressable array of a memory device, such as transistor memory cells arranged in an array of a NAND or NOR flash memory. Storage unit 110 may comprise other types of storage, such as a hard disk drive, phase change memory, resistive RAM, magnetic RAM, spin-torque RAM, etc. A configuration table 125, which may be stored in the storage unit 101 or elsewhere, includes connection assignments between the modules of the system 100.

A controller 120 facilitates the configuration of linkages of various circuit modules 130 to the storage unit. The controller 120 includes switching circuitry 122 and configuration circuitry 124. The switching circuitry 122 is configured to selectively couple specific modules within circuit modules 130. The configuration circuitry is configured to access the configuration table from mass storage unit 110 and to operate the switching circuitry to connect the circuit modules 130 according to the configuration table. The circuit modules 130 include an electronic neural network module, a programmable state machine module, and input/output interfaces, for example.

Figure 2:
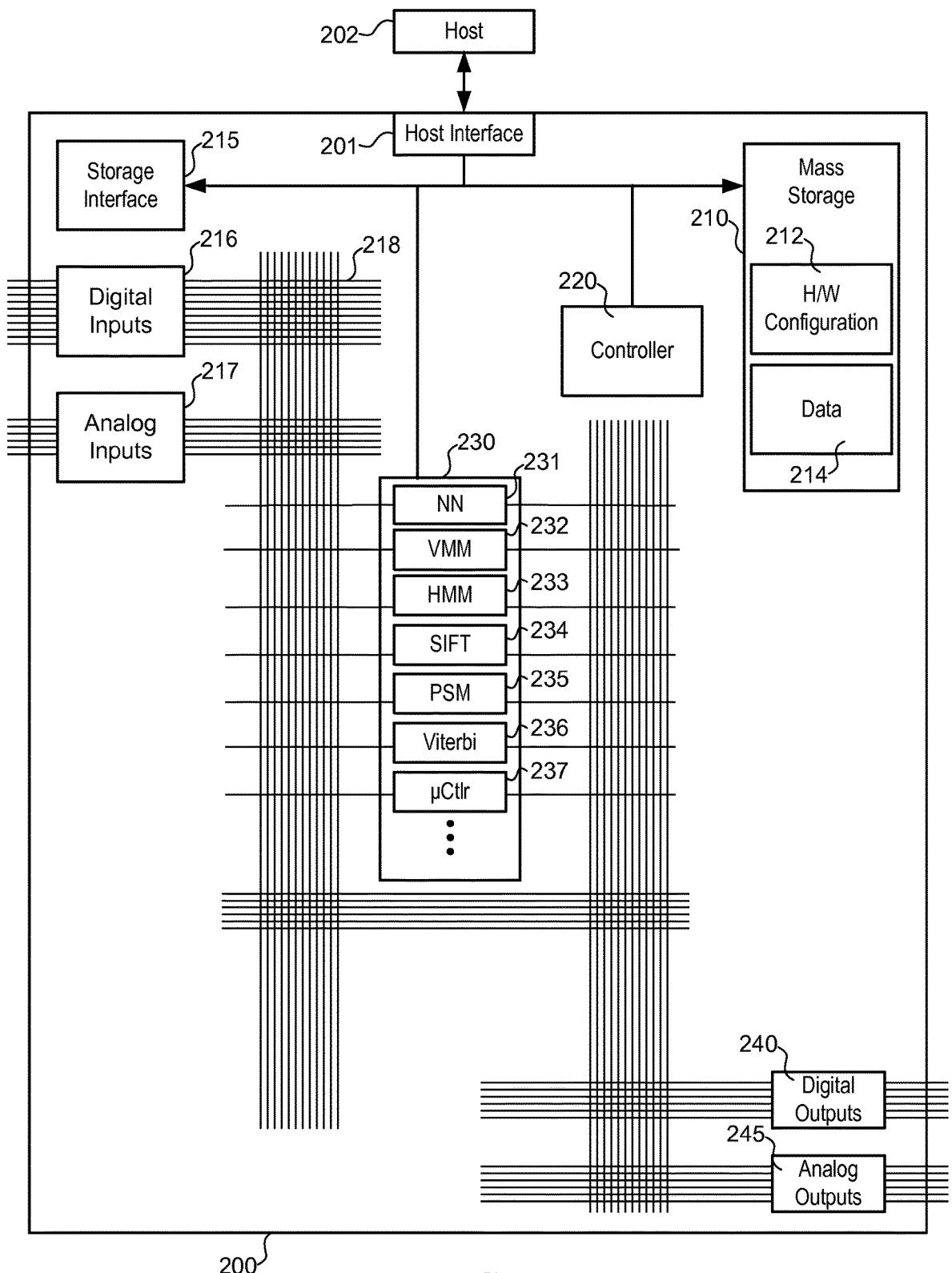
FIG. 2 is a block diagram of an apparatus according to another example embodiment.

In FIG. 2, a block diagram shows details of an apparatus 200 (e.g., a storage compute device) according to another example embodiment. The apparatus 200 includes a mass storage device 210. The storage of mass storage device 210 may have a hardware configuration portion 212 and a data portion 214, any portion of which may be accessible by an external host 202 via host interface 201. The external host may be disconnected from the device 200 during normal device operation if the device is used as an embedded system. The hardware configuration 212 includes data that defines system interconnections, and can be stored and retrieved by an external host 202 and also by a controller 220. The data portion 214 may be used for storing files and data (either temporarily or permanently) processed and used by configuration PIN circuits of the apparatus. The storage of data portion 214 may include any combination of data storage media, including magnetic and solid-state memory. A storage interface 215 provides a link between the storage device 210 and the rest of the system for file and data storage and may be a part of controller 220.

The apparatus 200 includes a host interface 201 that facilitates communication with the host 202. According to various configurations the host 202 is external. The host interface 201 may include a conventional mass storage interface (e.g., SATA, SAS, SCSI, PCIe, etc.) that provides access to the contents of the mass storage device 210. Commands (e.g., read block, write block, read memory, write memory, etc.) of the host interface 201 may also be used to send commands to a controller 220. The controller 220 may include an application specific integrated circuit (ASIC) that controls high level functions of the device, such as servicing host commands, and facilitating configuration and operation of modules 230 on the apparatus 200.

The system may also include various digital and analog inputs 216, 217, as well as digital and analog outputs 240, 245. The analog inputs and outputs 217, 245 may include associated encoders and decoders that convert between analog and digital signals from other components, such as sensors. In other arrangements, encoders and decoders may be included elsewhere, e.g., as part of modules 230. The controller 220 configures linkages for various circuit modules 230. These linkages may interconnect the different modules 230 to each other, as well as connecting the modules 230 to the storage unit 210 and/or other parts of the apparatus 200. The linkage of the circuit modules 230 may be facilitated by switches placed at intersection points, as represented by intersection point 218. The switches may be programmable by the controller 220.

The circuit modules 230 may perform a variety of processing tasks. Generally, the circuit modules 230 (as well as other portions of the apparatus, such as inputs, outputs, and mass storage) may be dynamically configured as interconnected processing nodes. The nodes work in conjunction to solve specific problems. Various machine learning modules (e.g., neural network module 231) can be trained and learn through trial and error by modifying the connections between nodes and/or adjusting the weighting of the connections between nodes. These modified connections may be temporary or permanent, and may be saved to persistent memory (e.g., mass storage unit 210).

The circuit modules 230 may include a neural network module 231. The neural network module 231 is a machine learning module that includes circuits representing a collection of interconnected neural elements. Each of the neural elements includes a transfer function for converting inputs to outputs. The outputs of each neural element may have different weightings that affect the strength of the connections. The neural network module 231 may be implemented in very-large-scale integrated (VLSI) circuitry that performs this function in an analog and/or a digital computation fashion.

The circuit modules 230 may also include a Vector Matrix Multiplier (VMM) module. The VMM module 232 can efficiently perform matrix multiplications, and can be used for solutions involving large and/or sparse matrices. Inputs to other modules (e.g., neural network modules) may be in the form of sparse vectors or matrices, and the VMM module can be used for pre-processing or post-processing of this type of data.

The circuit modules 230 may also include a Hidden Markov Model (HMM) module 233, which is also a machine learning module. Hidden Markov Models are used in applications such as temporal pattern recognition. An HMM is a statistical model that assumes a Markov process with hidden states. Hidden Markov Models are used in speech recognition, where the HMM analyzes segments of speech (e.g., frequency domain components of the segments) and to determine phonemes based on an acoustic model. The HMM module 233 may also be trained and/or adapt to changing conditions during use.

The circuit modules 230 may additionally or alternatively include a Scale-Invariant Feature Transform (SIFT) module 234. The SIFT algorithm is used in computer vision applications. Like neural networks or HMMs, the SIFT matches features from an image and compares the images to corresponding features extracted from training images. In order for the recognition to be robust, the matching algorithm should work even if the features have a different scale/orientation and be resistant to noise, different lighting conditions, color variation, etc. The SIFT algorithm matches features based on Euclidean distance of their feature vectors. As such, the inputs to the SIFT module 234 may be images, and the outputs features vectors of the images. The SIFT module 234 may also be involved in matching feature vectors, and can adjust parameters based on success rate. As such, the SIFT module 234 may also be considered a machine learning module.

The circuit modules 230 may additionally or alternatively include a programmable state machine (PSM) module 235. The PSM module 235 is a programmable logic device that can be used to implement a finite state machine. The PSM module 235 may include fixed or reconfigurable functions. For example, the PSM module 235 may include some fixed functions (e.g., set via antifuses) and other functions that can be altered by code running on the processor. The PSM module 235 can be used to implement relatively simple logic functions that need to be performed rapidly. For example, the PSM module 235 may be used to condition inputs or outputs of the other processing modules 230, handle signals and events related to processing, etc.

The circuit modules 230 may additionally or alternatively include a Viterbi module 236 that is configured to implement a Viterbi algorithm. A Viterbi algorithm finds the most likely path through a trellis that represents a set of states of a finite state machine (FSM). The Viterbi algorithm is used for, among other things, decoding of data from transmission channels.

The circuit modules 230 may also include a microcontroller/microprocessor unit 237 that provides control over other modules 230. The microcontroller 237 may be used to provide more complicated functionality than the PSM module 235. The microcontroller 237 may be configured to operate independently of the controller 220 of the apparatus 200. As such, after configuration, the processing modules 230 may be able to operate in the background while the controller performs conventional storage operations, such as servicing host requests.

Additional modules (not shown) may be included with the modules 230, such as analog circuitry (sensors, filters, amplifiers, comparators, converters, servo/motor controllers, etc.), displays, switches, pushbuttons, encoders, decoders, digital signal processors, universal asynchronous receiver/transmitter (UART) or other data transfer lines (e.g., for debug/diagnostics). Linkages between each of the modules can be turned on or off by the manufacturer or user based on programming of the H/W configuration data 214. The user may be able to add additional modules and/or change modules for use in the system via compiled code loaded into the microcontroller 237, for example.

When the system is booted up, the device 200 may be configured to read mass storage, beginning from a predefined logical location (e.g. a logical block address, a volume, a partition, a file, etc.) for configuration instructions located in the configuration table 212. The device 200 programs hardware according to the instructions in the mass storage 210. The mass storage 210 may also have data 214 to supply VMMs and/or HMMs, for example at a different logical location. Additional regions of the mass storage can be used for recording, for example.

Figure 3:
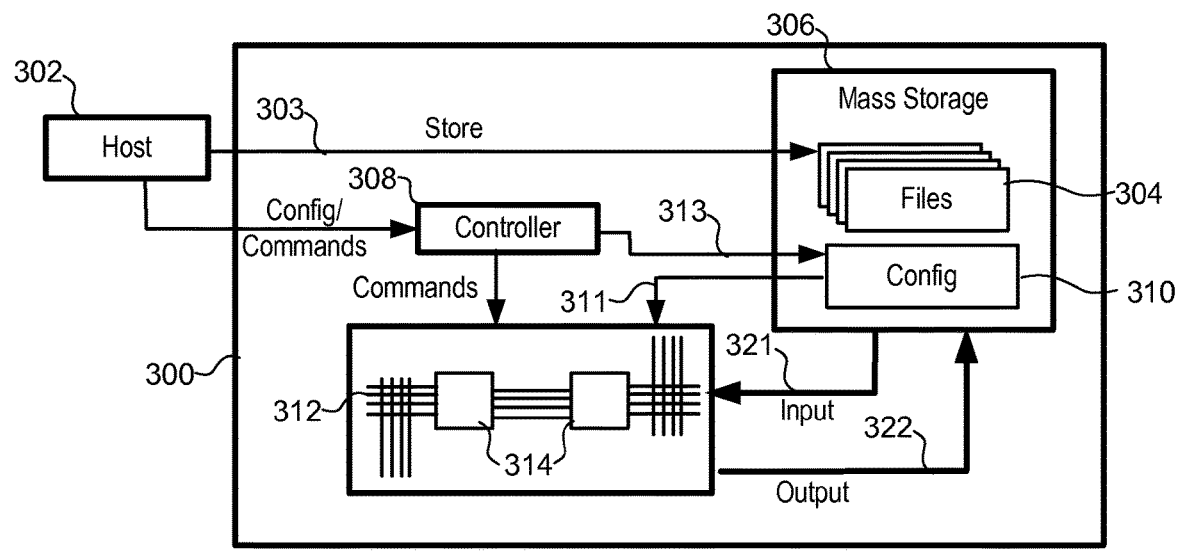
FIGS. 3 and 4 are block diagrams showing use case according to an example embodiment.

In FIG. 3, a block diagram illustrates a use case for an apparatus 300 (e.g., storage compute device) according to an example embodiment. The mass storage 306 of apparatus 300 may be used as a general-purpose storage device, a host 302 having stored 303 content of interest as files 304 to mass storage 306, such as images, sound, log data, web pages, etc. The content may be stored in various formats, e.g., a database or raw blocks of data. This transferred host content may be part of a server, a cloud storage facility or some other mass data storage facility.

At some point, it may be desirable to search through the stored files 304, or otherwise perform an analysis on the stored files 304. For example, it may be desirable to mine historic data using algorithms that were not available when the data was first stored. Instead of performing such analysis via a host, the apparatus 300 is configured to perform the analysis on its own, independent of the host 302. This facilitates mass processing of the data via the devices on which the data is stored. The host 302 can send a command 307 to a controller 308, causing a configuration 310 to be loaded 311 to a switching fabric 312 (or similar switching circuitry) and to affected modules 314. The configuration 310 may also be loaded 313 to the mass storage unit 306 by the host 302, either before or after it is applied to the modules 314 and switching fabric 312.

The configuration 310 may cause the affected modules 314 to operate in a particular mode, and may cause internal reconfiguration of the modules 314. For example, training data may be loaded into a machine learning module so that it is configured to perform a specialized search. The configuration 310 may also configure a PSM module and/or microcontroller to perform particular functions associated with the search, e.g. load and queue input data. In other cases, the configuration 310 may cause the PSM module and/or microcontroller to perform learning/training algorithms on the stored data, such that training data can be created and/or refined based on data stored in the files 304.

The host 302 may also send commands (e.g., object code) that governs operation of the data processing by the modules 314. These commands may identify source data, e.g., files of interest 304 stored in the mass storage unit 306. The commands may define where results are to be stored, when the processing is to start and end, etc. Some of the commands may executed by the system controller 308, while others may be sent from the controller 308 to the modules 314. After configuration, the modules 314 independently process data. The files 304 can be used to form an input stream 321, and the processed data results in an output stream 322. The output stream 322 may also be stored on the mass storage unit 306, e.g., in files or a database. The input and/or output stream 321, 322 may also be received from or directed to external components, e.g., other drives in an array, host processor, network nodes, etc.

Figure 4:
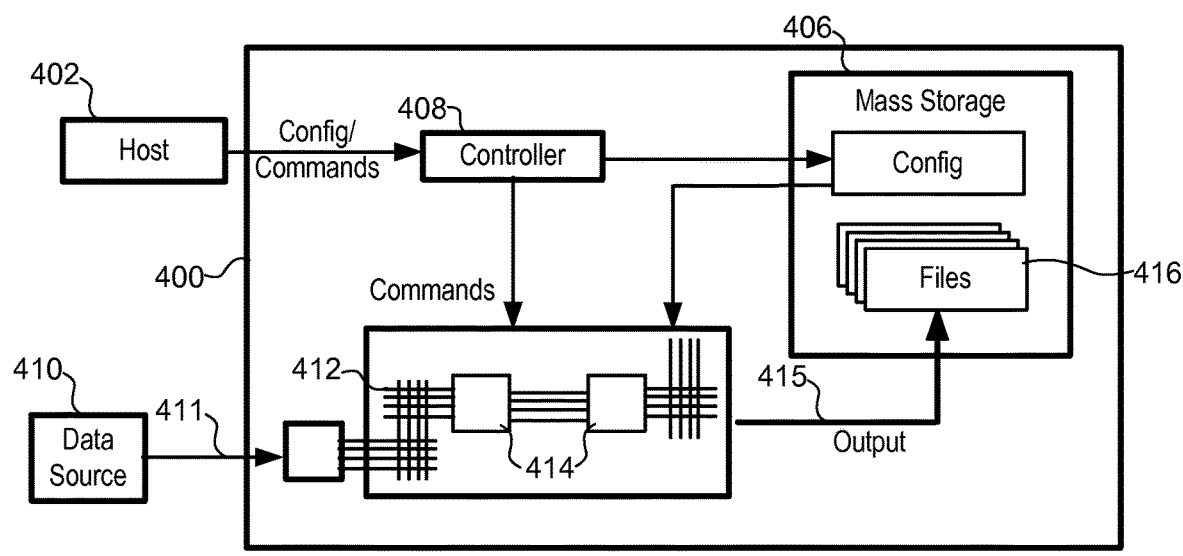

In FIG. 4, a block diagram illustrates a use case for an apparatus 400 (e.g., storage compute device) according to another example embodiment. The apparatus 400 includes mass storage unit, controller 408 switching fabric 412 and configurable processing modules 414. The switching fabric 412 and processing modules 414 are configured as previously described in relation to FIG. 3. In this example an analog and/or digital input is configured to receive a live stream of data 411 from a data source 410, e.g., camera, microphone, sensors, network data monitor, etc.

After configuration, the modules process the data stream 411, e.g., detecting features in the stream. An output stream 415 of this feature data is stored to the mass storage 406 as files 416, although other forms of storage may be used (e.g., database, storage blocks, directly-mapped memory, etc.). This stream of output data 415 may be stored for future reference, and/or may be analyzed by host 402 or other modules (not shown) to search for a particular patterns. In such a case, the other modules may take action if a match is found, such as to send a message to the host 402.

Figure 5:
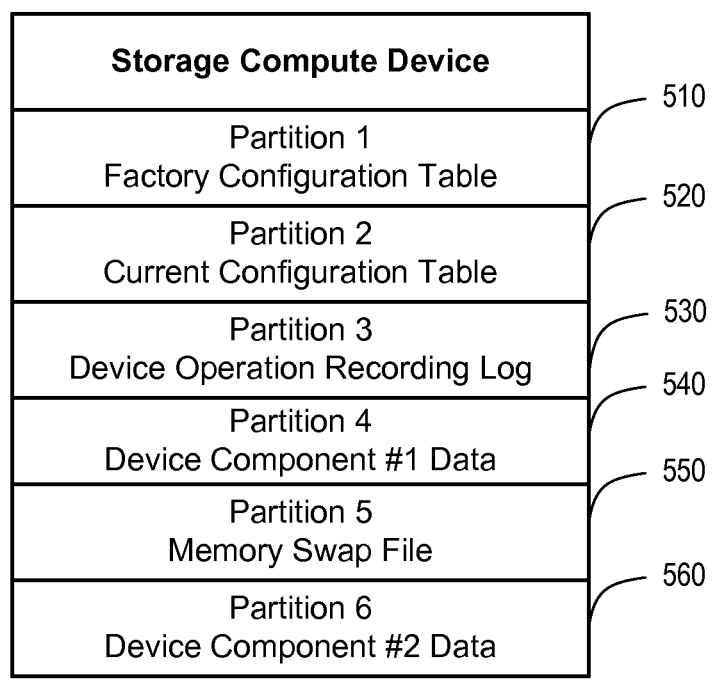
FIG. 5 illustrates an organization for a storage compute device in accordance with embodiments described herein.

FIG. 5 illustrates an organization for a storage compute device in accordance with embodiments described herein. The storage compute device may have multiple partitions. The storage compute device has a factory configuration table partition 510 and a current configuration table 520. At manufacturing, the factory configuration table and the current configuration table are programmed with identical data. The current configuration table is used 520 for normal device operation, as a default table, for example, and may be updated as the device is in service. Should the device malfunction, the current configuration table 520 can be reprogrammed by recopying the factory configuration table 510 to the current configuration table, thereby restoring the device to its original configuration.

The storage compute device may also contain other partitions that facilitate its operation. For example, the device contains a partition that records device operations in a log 530. The storage compute device may also contain data for various device components and/or subsystems 540, 560. The device component data 540, 560 may include configurations and instructions used to operate a switching fabric and processing modules of a storage compute device as described above. The configured processing modules may send data to the recording log 530. FIG. 5 shows data for two different device components 540, 560, but may include more or fewer partitions for device component data. The storage compute device may also include a partition for a memory swap file 560. This may be used as virtual memory for the processing modules as describe above, and/or for conventional storage-processing controllers.

Figure 6:
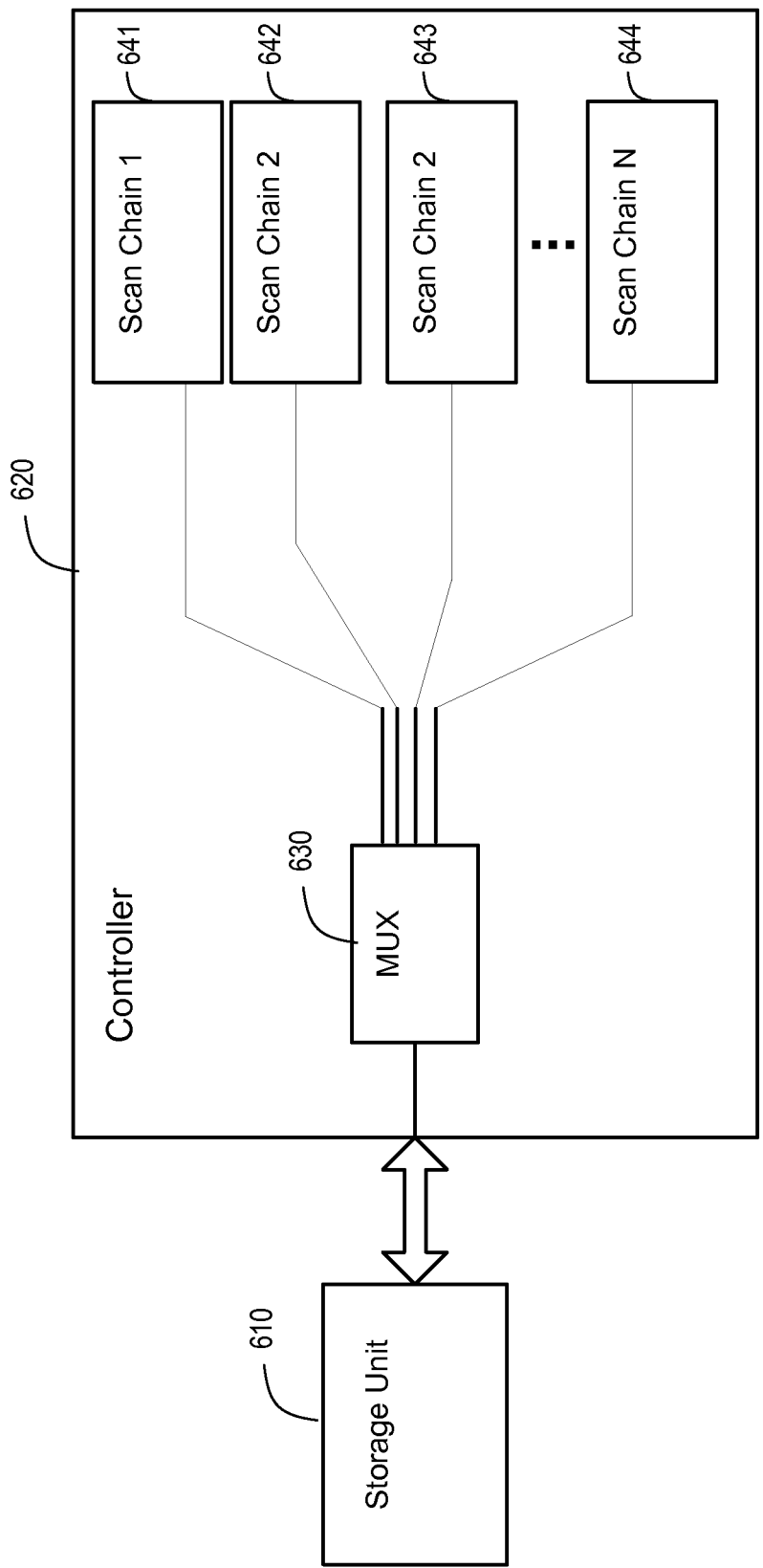
FIG. 6 illustrates a system in accordance with an example embodiment.

FIG. 6 illustrates a system in accordance with an example embodiment. The system includes a storage unit 610 and a controller 620. The controller uses data stored in a series of scan chains 641, 642, 643, 644 to setup (at boot-up) and detect (at shut-down) the connections within the system. The inputs and outputs of scan chains 641, 642, 643, 644 are each coupled to a multiplexor 630 which is then coupled to storage unit 610. Generally, a scan chain includes a data line that can be used to set (at boot-up) or detect (at shut-down) the state of a particular point (e.g., node, intersection, data line, power line, etc.) of a circuit. The scan chain may include various circuits such as switches, buffers, flip-flops, etc., that facilitate configuring the state of the entire circuit, e.g., switching fabric and processing modules as described above.

According to various embodiments, different sets of scan chains may be used in different scenarios. For example, before shutting down, the state of all the scan chains 641-644 may be read via the multiplexor 630 and stored in persistent memory 610. Upon, powering back up, the state can be read from the persistent memory 610 and applied back to the scan chains 641-644 via the multiplexor 630. In this way, the system can revert to a previous operating condition without booting and other initialization processes associated with general-purpose computers. The system design may avoid the additional overhead of connecting conventional busses and control circuitry to all the distributed points of the system. The system may avoid the additional overhead of having non-volatile memory elements scattered throughout the logic. If the system experienced a controlled shut down a different set of scan chains may be used than if the system experienced an uncontrolled shut down, e.g., an unexpected power failure. A certain set of scan chains may be used if there is a malfunction in the system. A set of scan chains may be associated with a certain set of modules, for example.

Figure 7A:
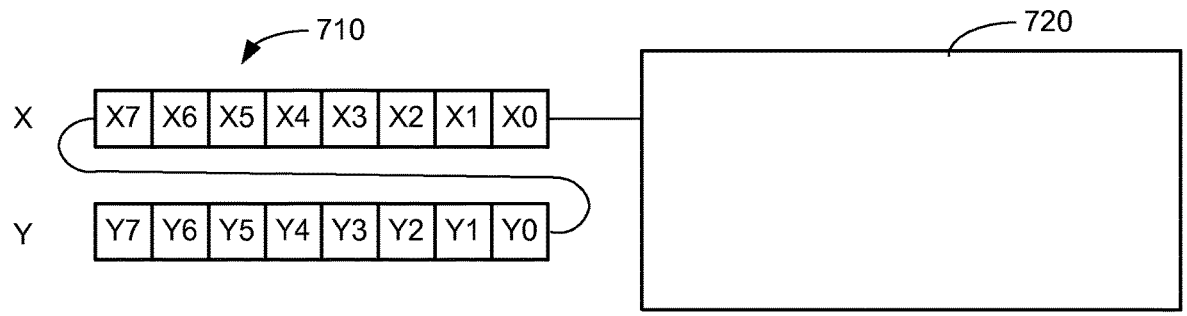
FIGS. 7A-7D illustrate a scan chain process that can be implemented to store state data.

FIG. 7A illustrates a scan chain process that can be implemented to store state data to embedded nonvolatile memory in preparation for power loss. In the example of FIG. 7, the scan chain 710 includes two 8 bit registers, Register X and Register Y. Registers X and Y include a memory element, e.g., flip flop, for each register bit. Note that the registers in an IC may be arranged in any number of scan chains. It will be appreciated that the length of a scan chain determines the time required to scan the registers of the scan chain into non-volatile storage. Thus, higher priority registers and/or higher priority register groups may be arranged in shorter scan chains than lower priority registers and/or lower priority groups.

Figure 7B:
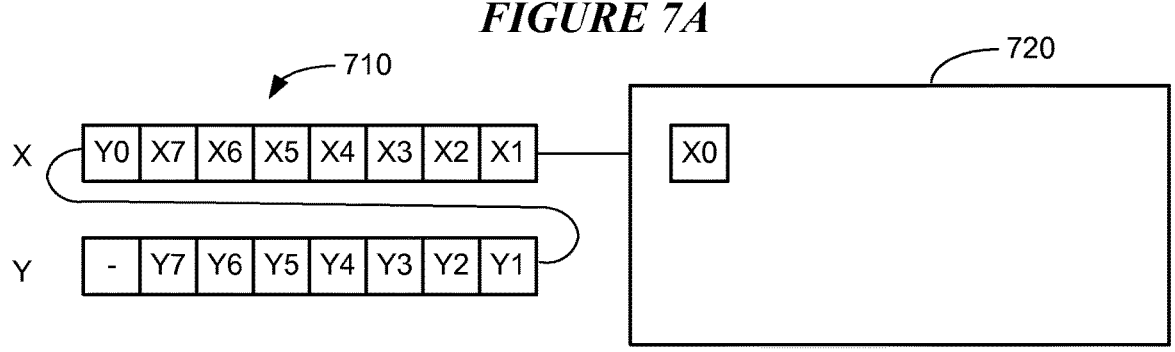
Figure 7C:
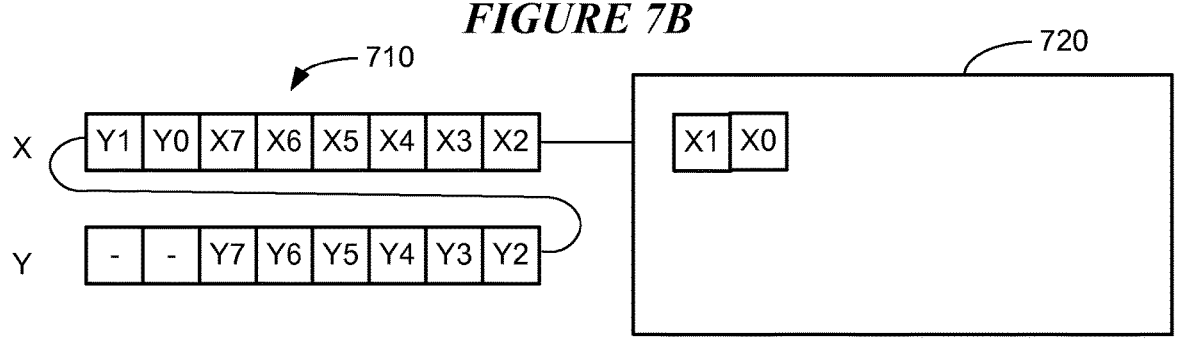
Figure 7D:
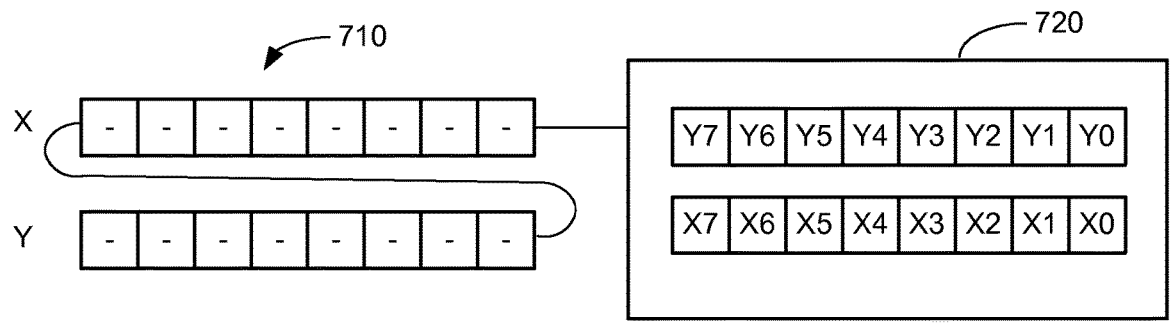

FIG. 7A represents the state of Registers X and Y before the scan operation begins. Register X includes binary data $X_7X_6X_5X_4X_3X_2X_1X_0$ and Register Y includes binary data $Y_7Y_6Y_5Y_4Y_3Y_2Y_1Y_0$. On the first clock cycle of the scan operation, bit $X_0$ is scanned into the nonvolatile storage 720 and all the other bits move to the next position in the scan chain, as illustrated in FIG. 7B. On the second clock cycle, bit $X_1$ is scanned into the nonvolatile storage 720 and the other bits move to the next position, as illustrated in FIG. 7C. FIG. 7D shows the state of the registers X and Y and non-volatile storage 720 after the last clock cycle of the scan process. All of the bits previously stored in the scan chain 710 have been transferred to the nonvolatile storage 720. In some cases, this storage may be done a bit at a time. According to various implementations, the system first accumulates bits in a volatile buffer which are then stored to nonvolatile memory in larger accumulations, such as bytes, pages, logical blocks, etc. Multiple scan chains operating in parallel, either synchronously or asynchronously, may be used to transfer the accumulated bits. These parallel operations increase bandwidth available which may reduce the time to complete a "set" or "detect" operation. While the scan chain method is discussed herein, other embodiments such as configuration/state registers accessible directly by the control processor/PSM are possible. In a substantially static environment, the initial state could be implemented directly into the silicon design with no programmable support beyond control to assume the initial state (e.g. a reset signal).

Figure 8A:
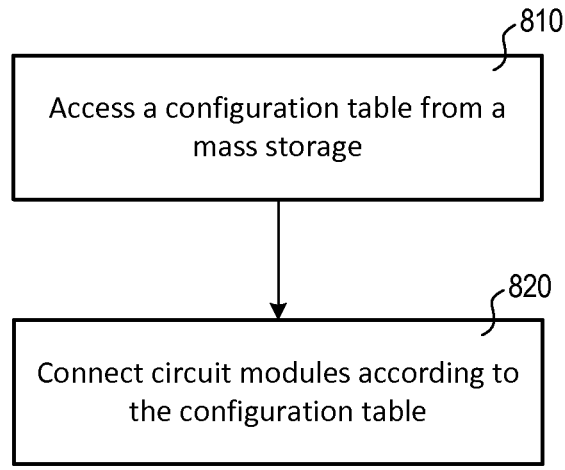
FIGS. 8A-8B are flow diagrams that illustrate processes according to embodiments discussed herein.

FIG. 8A is a flow diagram that illustrates processes according to embodiments discussed herein. The process includes accessing 810 a configuration table from a mass storage unit. The configuration table contains information regarding connections of various circuit modules. The circuit modules may include a machine learning module, a programmable state machine modules, and input/output interfaces, for example. The circuit modules are connected 820 according to the information in the configuration table. The circuit modules may be coupled to each other and/or other components in the system.

Figure 8B:
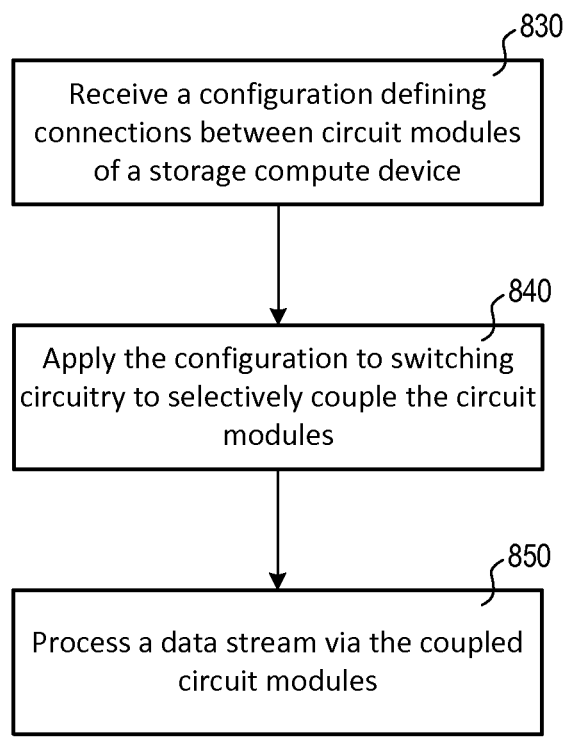

FIG. 8B is a flow diagram in accordance with embodiments described herein. A configuration defining connections between circuit modules is received 830 from a host. According to various implementations, the circuit modules include a machine learning module, a programmable state machine module, and input/output interfaces. The configuration is applied 840 to switching circuitry to selectively couple the circuit modules. A data stream is processed 850 via the coupled circuit modules.

Figure 9:
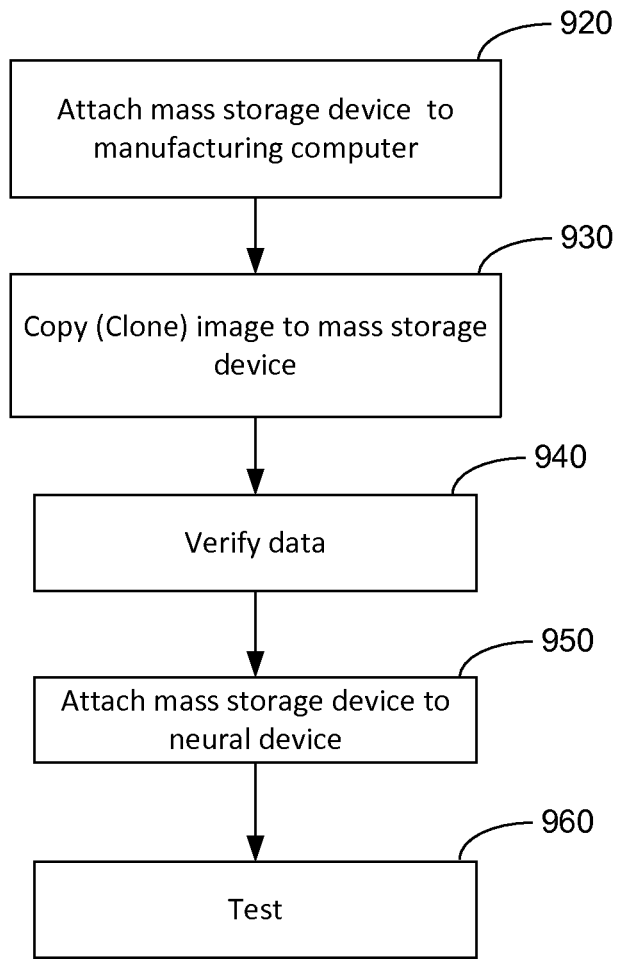
FIG. 9 illustrates a flow diagram in accordance with various embodiments.

FIG. 9 illustrates a flow diagram in accordance with various embodiments. The process may occur during product manufacturing, for example. The mass storage device of the storage compute device is attached 920 to a device interface of a manufacturing computer. The manufacturing computer image is copied 930 to the mass storage device. The image on the manufacturing computer may include configuration instructions and files necessary for the operation of the device, for example. The system may verify 940 to determine if the copied image is correct. The mass storage device may be attached 950 to a neural device to test 960 to determine if the configuration is correct, for example.

Figure 10:
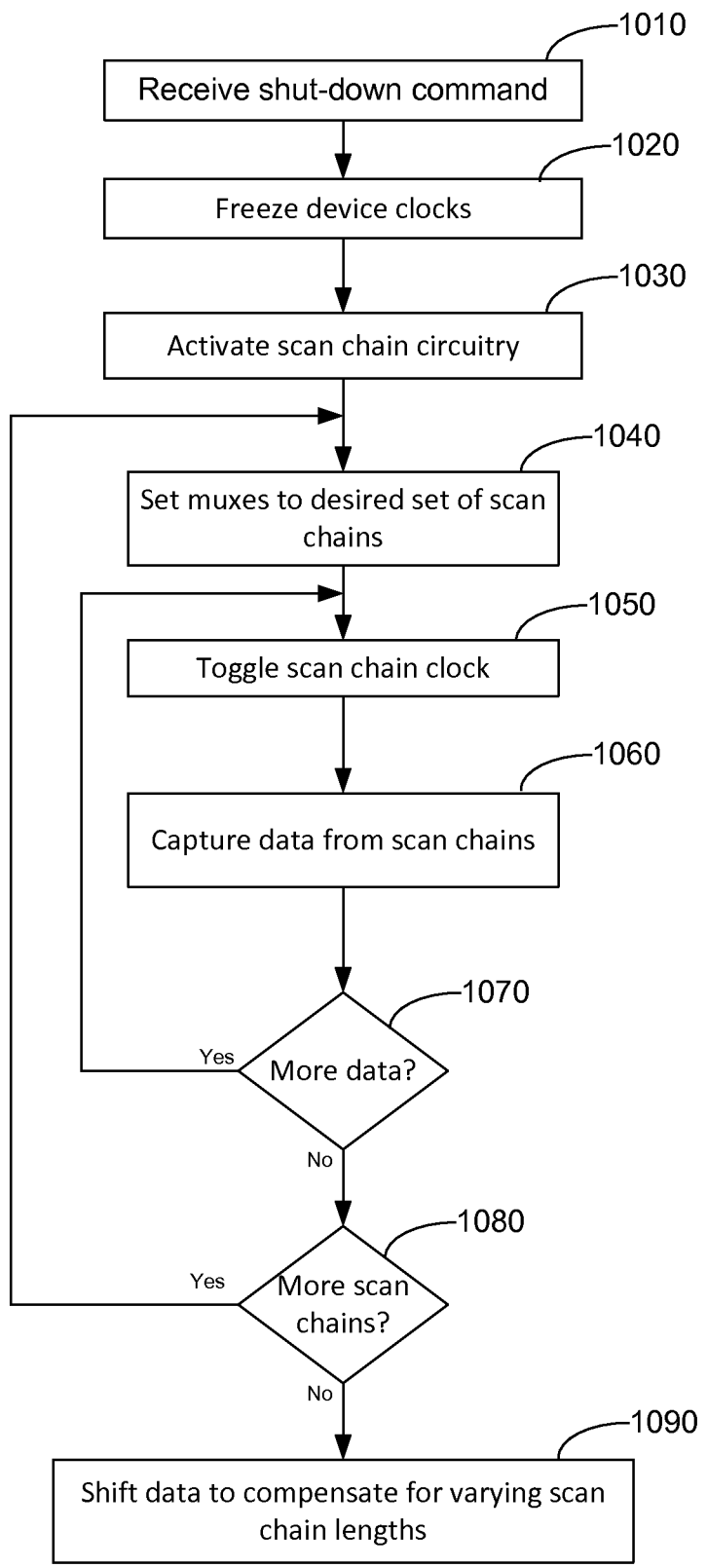
FIG. 10 shows another flow diagram for powering down the system and saving configuration instructions in accordance with embodiments described herein.

FIG. 10 shows another flow diagram for powering down the system and saving configuration instructions in accordance with embodiments described herein. A shut-down command is received 1010. Device clocks are frozen 1020 upon receipt 1010 of the shut-down command. Scan chain circuitry is activated 1030. The multiplexors are set 1040 to the desired set of scan chains and the scan chain clock is toggled 1050. Data is captured 1060 from the scan chains onto the storage device. The system determines 1070 if there is more data to capture. If is determined 1070 that there is more data to capture, the system toggles 1050 the scan chain clock and captures 1060 the data from the scan chains. If it is determined 1070 that there is not more data to capture, data is shifted to compensate for varying scan chain lengths.

Figure 11:
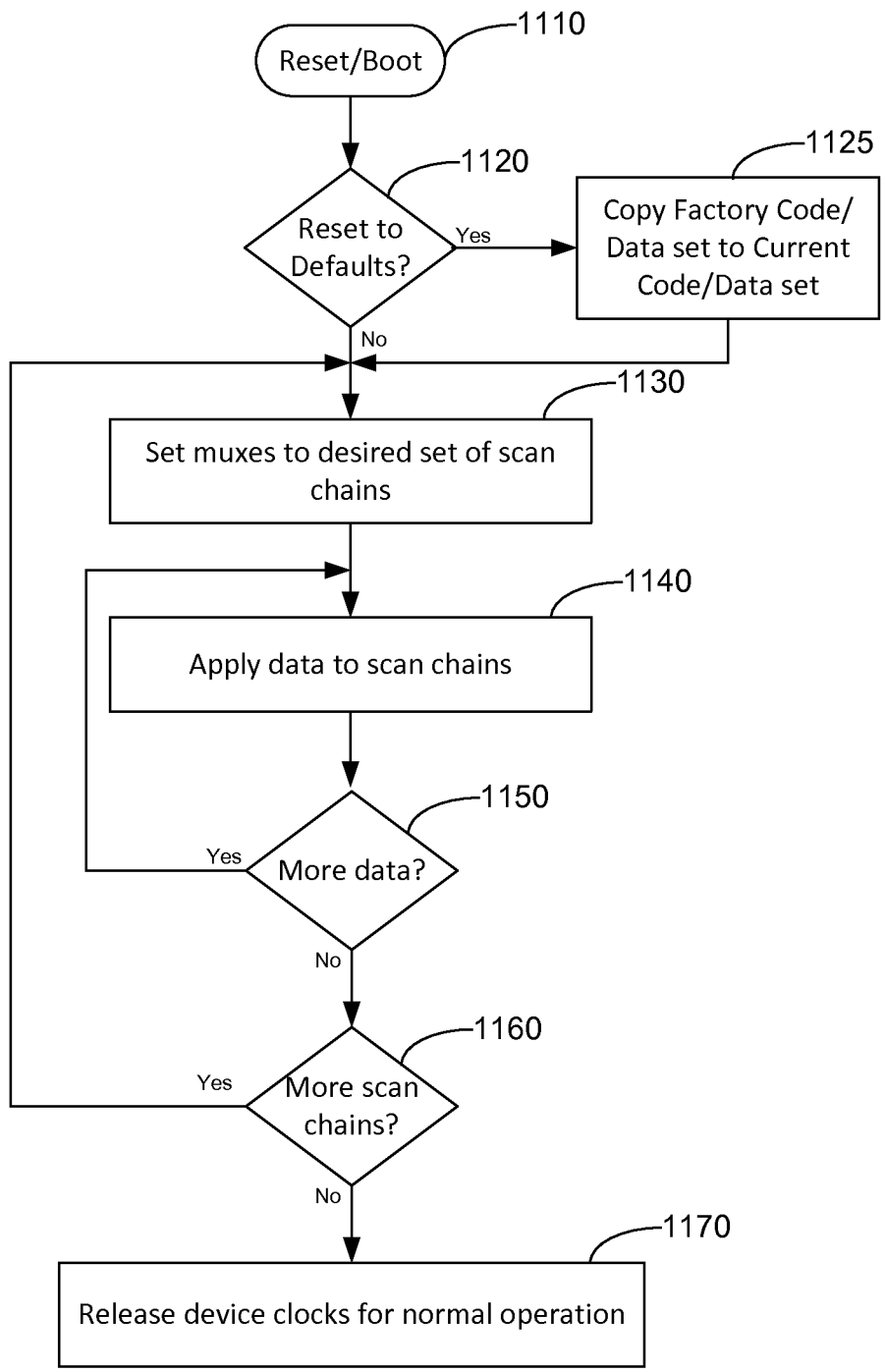
FIG. 11 shows a flow diagram according to various embodiments described herein.

FIG. 11 shows a flow diagram according to various embodiments described herein. The process in FIG. 11 may occur after reset or a boot of the storage compute device. The process checks 1120 whether the configuration instructions should be reset to default values. The system may be reset to default values due to a user command and/or after a malfunction of the system, for example. If it is determined 1120 that the configuration instructions should be reset to defaults, the factory configuration table is copied to the current configuration table partition of the storage compute device and the process continues. If it is determined 1120 that the system should not reset to defaults, the system sets 1130 the multiplexor to a desired set of scan chains. The desired set of scan chains may depend on how the system was shut down, e.g., controlled or uncontrolled and/or whether there was a malfunction. In some cases the set of circuit modules determines the desired set of scan chains. Data is applied 1140 to the desired set of scan chains. The system determines 1150 if there is any more data to be applied to the scan chains. If it is determined that more data should be applied to the scan chains, data is applied 1140 to the scan chains. If it is determined 1150 that there is not more data to apply to the scan chains, the system determines 1160 if there are more scan chains, the system sets 1130 multiplexors to the desired set of scan chains and applies 1140 data to scan chains. If it is determined 1160 that there are no more scan chains, device clocks are released 1170 for normal operation.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A storage compute device comprising:
 a mass storage unit;
 a host interface comprising a mass storage interface that provides, to a host, access to the mass storage unit via commands sent from the host to the storage compute device, the storage compute device operating as a conventional storage device in response to the commands;
 a plurality of circuit modules including a machine learning module, a programmable state machine module, and input/output interfaces;
 switching circuitry configured to selectively interconnect the circuit modules in response to configuration data sent from the host, the interconnected circuit modules performing an analysis of data stored on the mass storage unit using the machine learning module, the analysis performed independently of the host; and
 configuration circuitry configured to:
  access the configuration data and operate the switching circuitry to interconnect the circuit modules according to the configuration data;
  cause the interconnected circuit modules to independently analyze the data stored on the mass storage unit and store a result on the storage compute device;
  receive a shut-down command;
  in response to the shut-down command, activate scan chain circuitry comprising a plurality of scan chains configured to operate in parallel, the scan chains comprising connection data that define states of the switching circuitry and the interconnected circuit modules; and
  capture current configuration data from the plurality of scan chains onto the mass storage unit.

2. The storage compute device of claim 1, wherein the input/output interfaces comprise analog interfaces.

3. The storage compute device of claim 1, wherein circuit modules further include at least one of a vector matrix multiplier module and a Viterbi module.

4. The storage compute device of claim 1, wherein the machine learning module comprises at least one of a neural network module, a hidden Markov Model module, and a scale-invariant feature transform module.

5. The storage compute device of claim 1, wherein the switching circuitry is further configured to selectively couple the circuit modules to a portion of the mass storage unit.

6. The storage compute device of claim 1, wherein the configuration data includes training data that is loaded into the machine learning module to configure the machine learning module to perform a search on the data.

7. The storage device of claim 6, wherein the training data mines the data using algorithms that were not available when the data was first stored.

8. The storage compute device of claim 1, wherein the configuration data causes the programmable state machine module to perform a training algorithm on the data such that training data can be created or refined based on the data.

9. A system comprising:
 a host; and
 at least one storage compute device, comprising:
  a storage unit;
  a host interface comprising a mass storage interface that provides, to the host, access to the storage unit via commands sent from the host to the storage compute device, the storage compute device operating as a conventional storage device in response to the commands;

a plurality of circuit modules including a machine learning module, a programmable state machine module, and input/output interfaces, the circuit modules configured to process a data stream and write output of such to the storage unit;

switching circuitry configured to selectively interconnect the circuit modules in response to configuration data sent from the host, the interconnected circuit modules performing an analysis of the data stream using the machine learning module, the analysis performed independently of the host in response to receiving the configuration data; and configuration circuitry configured to:
    access the configuration data and operate the switching circuitry to connect the circuit modules according to the configuration data;
    cause the interconnected circuit modules to independently analyze the data stored on the mass storage unit and store a result on the storage unit
    after one or both of a reset and a boot determine whether the configuration data should be set to default values to connect the circuit modules; and
    if it is determined that the configuration data should be set to default values, copy factory configuration data to a configuration partition of the storage unit.

10. The system of claim 9, wherein the data stream is a live stream of data received at a data input of the at least one storage compute device.

11. The system of claim 9, wherein the configuration circuitry is configured to store current configuration data to the storage unit by capturing the current configuration data from scan chains.

12. The system of claim 9, wherein the configuration circuitry is configured to:
    receive a shut-down command; and
    apply current configuration data to scan chains upon receipt of the shut-down command.

13. The system of claim 9, wherein if it is determined that the configuration data should not be set to default values, the configuration circuitry is configured to apply the configuration data from the configuration partition to one or more scan chains.

14. The system of claim 9, wherein the at least one storage compute devices comprises a plurality of storage compute devices, the plurality of storage compute devices configured as nodes of a probabilistic inference network that is managed by the host.

15. The system of claim 14, wherein the probabilistic inference network performs a computation that is distributed by the host to the plurality of storage compute devices, facilitating mass processing of stored data on the plurality of storage compute devices by the plurality of storage compute devices.

16. A method comprising:
receiving commands from a host via a host interface of a storage compute device, the storage compute device operating as a conventional storage device in response to the commands
    receiving, from the host, a configuration defining connections between circuit modules of the storage compute device, the circuit modules including a machine learning module, a programmable state machine module, and input/output interfaces;
    applying the configuration to switching circuitry to selectively couple the circuit modules, the switching circuitry configured to selectively interconnect the circuit modules to a portion of a mass storage unit of the storage compute device;
    processing a data stream via the interconnected circuit modules, the processing comprising an analysis of the data stream using the machine learning module, the analysis performed independently of the host, a result of the analysis being stored on the mass storage unit of the storage compute device;
    receiving a shut-down command;
    in response to the shut-down command, activating scan chain circuitry comprising a plurality of scan chains configured to operate in parallel, the scan chains comprising connection data that define states of the switching circuitry and the interconnected circuit modules; and
    capturing current configuration data from the plurality of scan chains onto the mass storage unit.

17. The method of claim 16, wherein the machine learning module comprises at least one of a neural network module, a hidden Markov Model module, and a scale-invariant feature transform module.

18. The method of claim 16, wherein the data stream is a live stream of data received at a data input of the storage compute device.

19. The method of claim 16, wherein the data stream is formed from content previously stored on the mass storage unit.

* * * * *